(12) United States Patent
Kwon et al.

(10) Patent No.: US 10,526,540 B2
(45) Date of Patent: Jan. 7, 2020

(54) LIQUID CRYSTAL ALIGNING AGENT, LIQUID CRYSTAL ALIGNMENT LAYER COMPRISING THE SAME AND METHOD FOR PREPARING LIQUID CRYSTAL ALIGNMENT LAYER

(71) Applicant: LG CHEM, LTD., Seoul (KR)

(72) Inventors: Soon Ho Kwon, Daejeon (KR); Jung Ho Jo, Daejeon (KR); Hang Ah Park, Daejeon (KR); Hyeong Seuk Yun, Daejeon (KR); Hee Han, Daejeon (KR); Jun Young Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 127 days.

(21) Appl. No.: 15/565,878

(22) PCT Filed: Mar. 28, 2017

(86) PCT No.: PCT/KR2017/003354
§ 371 (c)(1),
(2) Date: Oct. 11, 2017

(87) PCT Pub. No.: WO2017/171368
PCT Pub. Date: Oct. 5, 2017

(65) Prior Publication Data
US 2018/0094193 A1    Apr. 5, 2018

(30) Foreign Application Priority Data

Mar. 28, 2016    (KR) .................. 10-2016-0037215

(51) Int. Cl.
| | | |
|---|---|---|
| C09K 19/56 | (2006.01) |
| C08L 79/08 | (2006.01) |
| G02F 1/1337 | (2006.01) |
| C09D 179/08 | (2006.01) |
| C08G 73/10 | (2006.01) |
| C08G 73/16 | (2006.01) |

(52) U.S. Cl.
CPC ............ *C09K 19/56* (2013.01); *C08G 73/101* (2013.01); *C08G 73/1067* (2013.01); *C08G 73/16* (2013.01); *C08L 79/08* (2013.01); *C09D 179/08* (2013.01); *G02F 1/1337* (2013.01); *G02F 1/133723* (2013.01); *G02F 1/133788* (2013.01); *Y10T 428/10* (2015.01); *Y10T 428/1005* (2015.01); *Y10T 428/1023* (2015.01)

(58) Field of Classification Search
CPC .. C09K 19/56; C08G 73/101; C08G 73/1067; C08G 73/16; C08L 79/08; C09D 179/08; G02F 1/1337; G02F 1/133723; G02F 1/133711; G02F 1/133788; Y10T 428/10; Y10T 428/1005; Y10T 428/1023

USPC ......... 428/1.2, 1.26, 395; 349/123; 526/262; 528/170; 427/553
See application file for complete search history.

(56) References Cited

U.S. PATENT DOCUMENTS

| | | |
|---|---|---|
| 2002/0019558 A1 | 2/2002 | Okada et al. |
| 2007/0128378 A1 | 6/2007 | Kim et al. |
| 2007/0161775 A1 | 7/2007 | Fang et al. |
| 2010/0060834 A1 | 3/2010 | Fang et al. |
| 2016/0195777 A1 | 7/2016 | Lee et al. |
| 2016/0244673 A1 | 8/2016 | Kunimi et al. |
| 2016/0264867 A1 | 9/2016 | Kunimi et al. |

FOREIGN PATENT DOCUMENTS

| | | |
|---|---|---|
| CN | 101137699 A | 3/2008 |
| CN | 101321845 A | 12/2008 |
| CN | 101558100 A | 10/2009 |
| CN | 103571501 A | 2/2014 |
| CN | 103827740 A | 5/2014 |
| CN | 104395282 A | 3/2015 |
| CN | 105367560 A | 3/2016 |
| JP | S57-131227 A | 8/1982 |
| JP | S59-145216 A | 8/1984 |
| KR | 10-2007-0058233 A | 6/2007 |
| KR | 10-0789595 B1 | 12/2007 |
| KR | 10-0939628 B1 | 1/2010 |
| KR | 10-2011-0079733 A | 7/2011 |
| KR | 10-1108227 B1 | 1/2012 |
| KR | 10-2013-0038230 A | 4/2013 |
| KR | 10-2013-0048726 A | 5/2013 |
| KR | 10-2013-0049699 A | 5/2013 |
| KR | 10-2013-0109018 A | 10/2013 |
| KR | 10-2014-0048890 A | 4/2014 |
| KR | 10-2014-0072198 A | 6/2014 |
| KR | 10-2015-0037576 A | 4/2015 |
| KR | 10-2015-0052111 A | 5/2015 |
| KR | 10-2015-0118527 A | 10/2015 |
| KR | 10-2016-0085407 A | 7/2016 |
| TW | 200535120 A | 11/2005 |
| WO | 2010-050523 A | 5/2010 |
| WO | 2011-149071 A1 | 12/2011 |
| WO | 2015-060360 A1 | 4/2015 |
| WO | 2015-060363 A1 | 4/2015 |

OTHER PUBLICATIONS

PCT Search Report & Written Opinion issued for International Application No. PCT/KR2017/003354 dated Jul. 7, 2017, 10 pages.

*Primary Examiner* — Ruiyun Zhang
(74) *Attorney, Agent, or Firm* — Rothwell, Figg, Ernst & Manbeck, P.C.

(57) ABSTRACT

The present invention relates to a liquid crystal aligning agent for use as an alignment layer for liquid crystal display. More specifically, the present invention relates to a liquid crystal aligning agent capable of improving an imidization rate and thus exhibiting an excellent alignment state, a liquid crystal alignment layer comprising the same, a preparation method thereof and a liquid crystal display comprising the liquid crystal alignment layer.

11 Claims, No Drawings

LIQUID CRYSTAL ALIGNING AGENT, LIQUID CRYSTAL ALIGNMENT LAYER COMPRISING THE SAME AND METHOD FOR PREPARING LIQUID CRYSTAL ALIGNMENT LAYER

CROSS REFERENCE TO RELATED APPLICATIONS

This application is a 35 U.S.C. § 371 National Phase Entry Application from PCT/KR2017/003354, filed on Mar. 28, 2017, and designating the United States, which claims priority under 35 U.S.C. § 119 to Korean Patent Application No. 10-2016-0037215 filed on Mar. 28, 2016 with the Korean Intellectual Property Office, the disclosure of which are herein incorporated by reference in its entirety.

BACKGROUND OF THE INVENTION

(a) Field of the Invention

The present invention relates to a liquid crystal aligning agent for use as an alignment layer for liquid crystal display. More specifically, the present invention relates to a liquid crystal aligning agent capable of improving an imidization rate and thus exhibiting an excel ent alignment state, a liquid crystal alignment layer including the same and a preparation method thereof.

(b) Description of the Related Art

Generally, a liquid crystal display includes a liquid crystal layer having a uniformly aligned molecule. A liquid crystal alignment layer for aligning a liquid crystal can be manufactured by a rubbing process, that is, by rubbing a rubbing fiber such as nylon or rayon with a polymer film. However, due to some major disadvantages and limitations of the conventional rubbing method of liquid crystal alignment, there has been a growing interest for practical alternative technologies.

The photo-alignment method is one of the best methods for replacing the rubbing process. As compared to the rubbing method, the photo-alignment method can more easily adjust the liquid crystal alignment axis and the anchoring energy, thereby achieving a high uniformity of the liquid crystal. The photo-alignment method can overcome the disadvantages of the rubbing process by which electric charging and foreign substances such as dust are generated, and can easily perform a patterning process.

The photo-alignment effect can be exhibited by orientational ordering formed on the alignment layer by irradiation of polarized light. The molecular orientational ordering of the photo-alignment layer occurs due to selective photochemical reactions, and these photochemical reactions are clearly different as the types of photosensitive species vary. The photochemical classification of photochemical materials can be divided into groups as follows. The first group consists of materials containing photosensitive species that undergo a trans-cis photoisomerization reaction. The first group includes azo compounds. Specific examples include azo dyes, azo dye blends and azo polymers [3,4], etc. which are chemically [1] and physically [2] absorbed. The second group consists of materials having photosensitive by-products resulting from photodegradation such as photooxidation or polymer chain scission, etc. Specific examples of the materials having the photosensitive by-products include photosensitive polyimides [5] and polysilanes [6], etc. The third group, which is mainly studied, includes materials undergoing photo-cross-linking in the form of a cycloaddition. These materials include cinnamate [7,8], coumarin and chalconyl chromophores [10] that undergo [2+2] cycloaddition reaction. The [2+2] cycloaddition reaction is typical of an anthracenyl chromophore [11].

These materials have advantages and disadvantages for each group. Azo compounds exhibit excellent liquid crystal alignment properties at a low radiation dose (0.5 J/cm$^2$ or less), but are unstable to light and heat because the photochemical reaction is reversible photochemistry. Photodegradable materials generally require a high irradiation dose (10 J/cm$^2$ or higher) and exhibit a high residual image.

Photo-crosslinking materials are generally more resistant to light and heat, compared to photodegradable materials, due to irreversible photo-crosslinking products in which the alignment of polymer chains is stabilized. However, conventionally, a polymer in which a photosensitive group is introduced into a side chain of the polymer has been used as a photo-crosslinking material. Since the liquid crystal alignment performance of these materials is changed by AC driving, there is a limitation in that an AC residual image remains in a liquid crystal display.

In addition, among the photo-crosslinking materials, polyamic acid ester-based polyimide precursors show a slightly lower degree of imidization in the curing process for preparing a liquid crystal alignment layer, and thus, additives such as base catalysts, amino acids and the like were used to improve the imidization rate. However, there existed a limitation in that the liquid crystal alignment properties were slightly reduced by the DC driving as such additives partially remained in the alignment layer.

Accordingly, there is still a need for studies on a liquid crystal aligning agent, in which liquid crystal alignment performance and an imidization rate are maintained at a high level even under the AC and DC driving conditions, without the use of the additives, by using a liquid crystal aligning agent into which a specific terminal group is introduced, and a liquid crystal alignment layer including the same.

SUMMARY OF THE INVENTION

It is one object of the present invention to provide a liquid crystal aligning agent capable of improving the imidization rate and thus exhibiting an excellent alignment state.

Further, it is another object of the present invention to provide a liquid crystal alignment layer including the liquid crystal aligning agent and a preparation method thereof.

The present invention provides a liquid crystal aligning agent including at least one selected group the group consisting of a polyimide precursor including a repeating unit represented by Chemical Formula 1 below and a terminal group represented by Chemical Formula 2 below; and a polyimide including a repeating unit represented by Chemical Formula 3 below and a terminal group represented by Chemical Formula 2 below:

[Chemical Formula 1]

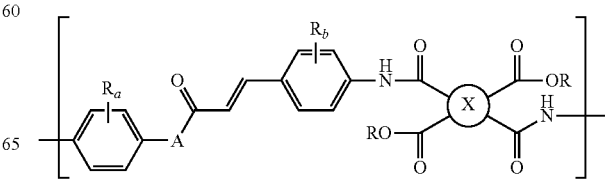

[Chemical Formula 2]

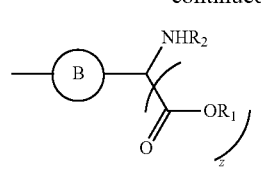

[Chemical Formula 3]

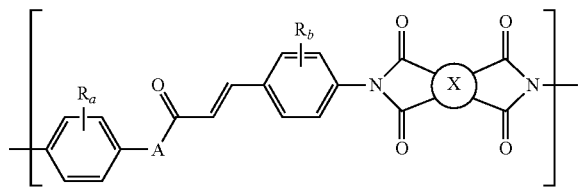

In Chemical Formulae 1 to 3,

X is each independently a tetravalent organic group,

R is each independently hydrogen or a $C_{1-10}$ alkyl group, $R_a$ and $R_b$ are each independently hydrogen or a $C_{1-10}$ alkyl group, $R_1$ is hydrogen or a $C_{1-10}$ alkyl group, $R_2$ is a thermally decomposable functional group, A is —O—, —S—, —NH— or a $C_{1-10}$ alkylene group, B is at least one bivalent functional group selected from the group consisting of a $C_{1-10}$ alkylene group, a $C_{6-20}$ arylene group, a $C_{7-20}$ arylalkylene group,

and

Z is 0 or 1.

The present invention provides a liquid crystal alignment layer including the liquid crystal aligning agent described above.

In addition, the present invention provides a method for preparing a liquid crystal alignment layer comprising: coating the liquid crystal aligning agent described above on a substrate to form a coating layer; drying the coating layer; irradiating the surface of the dried coating layer with polarized ultraviolet light to perform alignment treatment; and heat-treating the alignment-treated coating layer.

According to the liquid crystal aligning agent of the present invention, the liquid crystal alignment performance due to the AC driving is constantly maintained due to the improvement of the imidization rate, thereby reducing AC residual image. Further, the imidization rate can be increased without using additives, and thus it is possible to minimize the residual image by DC driving which can be expressed by a residual monomer.

DETAILED DESCRIPTION OF THE EMBODIMENTS

The present invention provides a liquid crystal aligning agent represented by Chemical Formula 1.

In addition, the present invention provides a liquid crystal alignment layer including the liquid crystal aligning agent.

Further, the present invention provides a method for preparing a liquid crystal alignment layer comprising: coating the liquid crystal aligning agent on a substrate to form a coating layer; drying the coating layer; and irradiating the surface of the dried coating layer with polarized ultraviolet light to perform alignment treatment.

Hereinafter, the liquid crystal aligning agent, the liquid crystal alignment layer including the same and the preparation method thereof according to specific embodiments of the present invention will be described in more detail.

In the present invention, it will be understood that, although the terms first, second, etc. may be used to describe various elements, and these terms are only used to distinguish one element from another element.

Further, the terminology used herein is for the purpose of describing particular embodiments only and is not intended to be limiting. As used herein, the singular forms "a," "an" and "the" are intended to include the plural forms unless the context clearly indicates otherwise. In the present disclosure, it will be further understood that the terms "comprise", "include", "have", etc. specify the presence of stated features, integers, steps, elements and/or combinations thereof but do not preclude the presence or addition of one or more other features, integers, steps, elements and/or combinations thereof.

In addition, in the present disclosure, it will be understood that when each layer or element is referred to as being formed "on" or "over" each of the layers or elements, each layer or element can be directly formed on each of the layers or elements, or another layer or element may be additionally formed between each layer, or on an object or substrate.

While a variety of modifications may be made to the present invention and there are various embodiments of the invention, examples of which will now be described in detail. However, this is not intended to limit the present invention to particular modes of practice, and it is to be appreciated that all modifications, equivalents and substitutions that do not depart from the sprit and technical scope of the invention are encompassed in the present invention.

According to one embodiment of the present invention, there may be provided a liquid crystal aligning agent including at least one selected group the group consisting of a polyimide precursor comprising a repeating unit represented by Chemical Formula 1 below and a terminal group represented by Chemical Formula 2 below; and a polyimide comprising a repeating unit represented by Chemical Formula 3 below and a terminal group represented by Chemical Formula 2 below:

[Chemical Formula 1]

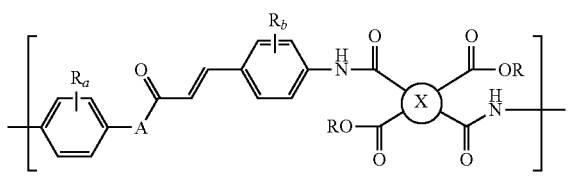

[Chemical Formula 2]

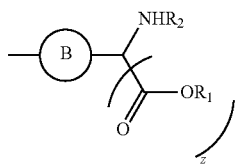

[Chemical Formula 3]

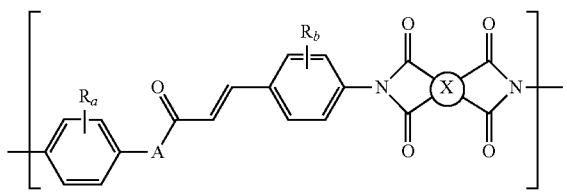

In Chemical Formulae 1 to 3,
X is each independently a tetravalent organic group,
R is each independently hydrogen or a $C_{1-10}$ alkyl group,
$R_a$ and $R_b$ are each independently hydrogen or an $C_{1-10}$ alkyl group,
$R_1$ is hydrogen or a $C_{1-10}$ alkyl group,
$R_2$ is a thermally decomposable functional group,
A is —O—, —S—, —NH— or a $C_{1-10}$ alkylene group,
B is at least one bivalent functional group selected from the group consisting of a $C_{1-10}$ alkylene group, a $C_{6-20}$ arylene group, a $C_{7-2}$ arylalkylene group, $$-\overset{O}{\underset{\|}{C}}- \quad \text{and} \quad -\overset{NH}{\underset{\|}{\underset{H}{N}}}-,$$

and
Z is 0 or 1.

Typical polyamic acid ester-based polyimide precursors show a slightly lower degree of imidization in the curing process for preparing a liquid crystal alignment layer, and thus the imidization rate has been improved by using additives such as base catalysts, amino acids and the like. However, in the case of preparing a liquid crystal alignment layer using such additives, there is a limitation in that a residual image due to the DC driving appears as some additives remain in the alignment layer.

In this regard, the present inventors have conducted studies to improve the limitations of these polyamic acid ester-based polyimide precursors, and found through experiments that the liquid crystal aligning agent comprising the polyimide precursor including the repeating unit represented by Chemical Formula 1 and the terminal group represented by Chemical Formula 2, and the polyimide including the repeating unit represented by Chemical Formula 3 and the terminal group represented by Chemical Formula 2 can increase the imidization rate due to the terminal group represented by Chemical Formula 2 even without using the additives, thereby minimizing the phenomenon of decreasing the liquid crystal alignment properties resulting from the use of the additives. Therefore, the present invention has been completed on the basis of such a finding.

Specifically, the repeating unit represented by Chemical Formula 1 above has a structure in which a photoreactive group is introduced into the main chain of polyamic acid or polyamic acid ester, and an alignment occurs by bonding between the main chains as the photoreactive groups are included in the main chains, and thus the liquid crystal alignment performance can be constantly maintained even under AC driving conditions. In particular, when a polarized ultraviolet light is irradiated to the polyimide precursor or polyimide, a [2+2]cycloaddition reaction is induced. Due to this reaction, the major axis of liquid crystals can be aligned in a direction perpendicular or parallel to the direction of the irradiated polarized ultraviolet light. Further, the photoreaction rate and stability can be further enhanced by the additional photoreaction of the C=C bond introduced into the polymer.

In the Chemical Formulae 1 to 3, the X may be each independently a tetravalent organic group, and specifically, it may be at least one functional group selected from the group consisting of Chemical Formulae 4 to 7 below:

[Chemical Formula 4]

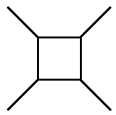

[Chemical Formula 5]

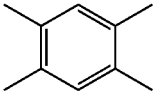

[Chemical Formula 6]

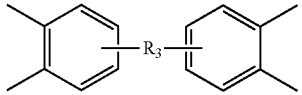

[Chemical Formula 7]

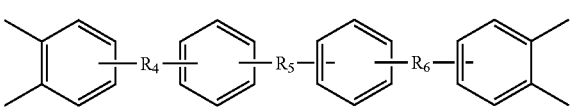

In Chemical Formulae 6 and 7, $R_3$ to $R_6$ are each independently at least one bivalent functional group selected from the group consisting of a direct bond, —O—, —S—, —C(O)—, —S(O)—, —C(O)O—, —O(C)O—, $C_{1-10}$ alkylene and —C(R') (R")—, and when the $R_3$ to $R_6$ include two or more functional groups, they are linked to each other, wherein the R' and R" are each independently an $C_{1-10}$ alkyl group substituted or unsubstituted with hydrogen or halogen.

Moreover, the X can be selected from the group consisting of Chemical Formulae below:

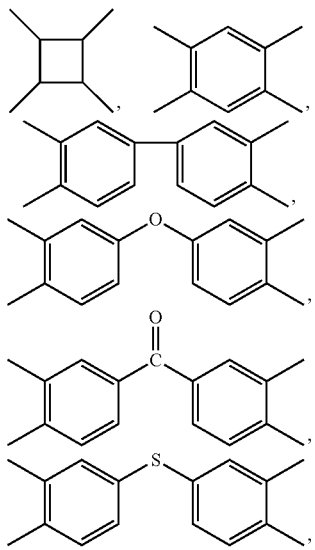

-continued

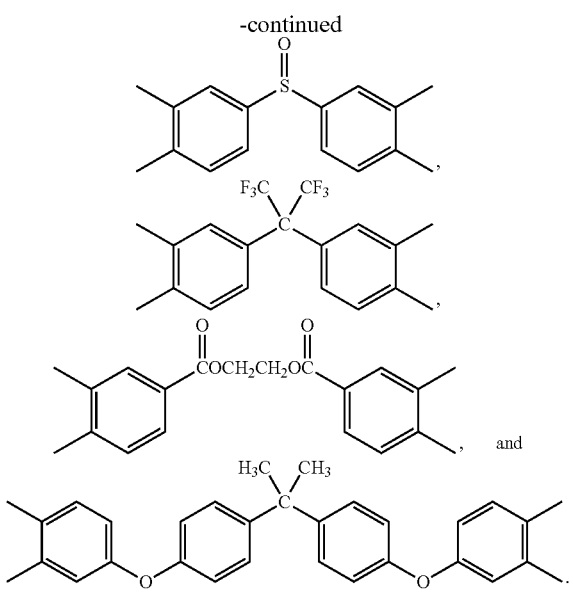

Furthermore, the R of Chemical Formula 1 above may be each independently hydrogen or a $C_{1-10}$ alkyl group, and may preferably be hydrogen, methyl or ethyl.

In addition, the $R_a$ and $R_b$ may be each independently hydrogen or an $C_{1-10}$ alkyl group, and may preferably be hydrogen, 2-methyl, 3-methyl, 2,3-dimethyl, 2,6-dimethyl and 3,5-dimethyl.

Moreover, the A may be O—, —S—, —NH— or $C_{1-10}$ alkylene, but may preferably be —O—, —NH—, —(CH$_2$)— or (CH$_2$)$_2$—.

Meanwhile, in the terminal group represented by Chemical Formula 2 above, the carboxyl group helps the imidization reaction through the interaction with a carbonyl group in the polymer, and the amine can play an important role acting as a catalyst to enhance the imidization degree. Further, the protecting group of the amine represented by $R_2$ can prevent the reaction from occurring during the preparation of the liquid crystal alignment layer, thereby enabling an introduction thereof into the terminal group.

Herein, the $R_1$ may be hydrogen or a $C_{1-10}$ alkyl group, and may preferably be hydrogen, methyl, ethyl, propyl or isopropyl.

Further, the $R_2$ is a thermally decomposable functional group, and when decomposed by heat, carbon dioxide is generated, and it is converted to hydrogen as a deprotecting reaction occurs, and consequently is converted to an amine structure. Such a thermally decomposable functional group may be preferably a tert-butoxycarbonyl group (BOC) or a 9-fluorenylmethoxycarbonyl group (FMOC).

The B may be at least one bivalent functional group selected from the group consisting of a $C_{1-10}$ alkylene group, a $C_{6-20}$ arylene group, a $C_{7-20}$ arylalkylene group,

and when the B includes two or more functional groups, they are linked to each other. The arylalkylene group refers to a functional group in which an aryl group and an alkylene group are linked.

Meanwhile, the liquid crystal aligning agent of one embodiment includes at least one selected from the group consisting of a polyimide precursor and a polyimide, and the weight average molecular weight of the polyimide precursor may be about 5,000 to 100,000 g/mol and the weight average molecular weight of the polyimide may be about 5,000 to 100,000 g/mol.

Further, the polyimide precursor has a structure in which a group for promoting the imidization reaction is introduced into the terminal of a polymer, whereby the portion protected by the protecting group during the heat treatment process may cause a deprotecting reaction, thereby improving the imidization rate by the newly generated functional group. Furthermore, the polyimide prepared by heating the polyimide precursor may cause a cross-linking reaction by the terminal amine represented by Chemical Formula 2, thereby enhancing the chemical resistance and strength. In addition, the liquid crystal aligning agent of one embodiment may include one or both of the polyimide precursor and the polyimide having the above-described characteristics.

Further, the liquid crystal aligning agent may be in a state of being dissolved in an organic solvent. The kind of the organic solvent and the concentration of the solution, etc. may be determined depending on the type and use of the polyimide precursor and the polyimide included in the liquid crystal aligning agent.

As such an organic solvent, cyclopentanone, cyclohexanone, N-methylpyrrolidone, DMF (dimethylformamide), acetamide, γ-butyrolactone, 2-butoxyethanol or a mixture thereof, etc. may be used, but is not limited thereto.

Furthermore, the solid concentration of the liquid crystal aligning agent is selected in consideration of the molecular weight, viscosity, volatility and the like of the polyimide precursor and polyimide. In order to achieve a desired liquid crystal alignment effect, have desirable coating characteristics, and have an appropriate viscosity, the liquid crystal aligning agent is preferably presented within a range of 0.5 to 30% by weight based on the total weight of the solution dissolved in a solvent.

In addition, the liquid crystal aligning agent may further include, in addition to the organic solvent for dissolving the polymer, a solvent for improving the uniformity of the coating layer when the liquid crystal aligning agent is coated onto the substrate. As such a solvent, a solvent which has a surface tension lower than that of the organic solvent is generally used. For example, ethylene glycol monoethyl ether acetate, ethylene glycol mono isopropyl ether, ethylene glycol monomethyl ether and the like can be used.

Meanwhile, according to another embodiment of the present invention, there may be provided a liquid crystal alignment layer including the liquid crystal aligning agent of one embodiment.

As described above, the liquid crystal aligning agent of one embodiment comprises the polyimide precursor including a specific terminal group and the polyimide, thereby increasing the imidization rate. As a result, the liquid crystal alignment performance due to the AC driving is constantly maintained, which reduces the AC residual image resulting therefrom. Further, since the imidization rate can be increased without the use of the additives, the residual image due to the DC driving which can be expressed by a residual monomer can be minimized.

Furthermore, according to still another embodiment of the present invention, there may be provided a method for preparing a liquid crystal alignment layer comprising: coating the liquid crystal aligning agent of one embodiment onto a substrate to form a coating layer; drying the coating layer;

irradiating the surface of the dried coating layer with polarized ultraviolet light to perform alignment treatment; and heat-treating the alignment-treated coating layer.

In the step of forming the coating layer, the coating method may be determined depending on the type and use of the liquid crystal aligning agent. For example, it can be coated onto the surface of a substrate formed by patterning a transparent conductive film or a metal electrode by using a method such as a roll coater method, a spinner method, a printing method, an inkjet spraying method or a slit nozzle method.

In addition, when the liquid crystal aligning agent is coated, in some cases, functional silane-containing compounds, functional fluorine-containing compounds and functional titanium-containing compounds are previously coated onto the substrate in order to further enhance the adhesion of the substrate surface, the transparent conductive layer, the metal electrode and the coating layer.

Next, the step of drying the coating layer may be carried out through heating of a coating layer or vacuum evaporation, etc.

Herein, the drying step is preferably carried out at 50 to 150° C. for 10 to 300 seconds.

Further, in the step of irradiating the surface of the dried coating layer with polarized ultraviolet light to perform alignment treatment, the alignment treatment can be carried out by irradiating polarized ultraviolet light in the wavelength range of 150 to 450 nm. Herein, the intensity of the exposure may vary depending on the type of a polymer, and an energy of 50 mJ/cm$^2$ to 10 J/cm$^2$, preferably an energy of 500 mJ/cm$^2$ to 5 J/cm$^2$ may be irradiated.

As the ultraviolet light, a polarized ultraviolet light may be used. The polarized ultraviolet light may be irradiated perpendicularly to the substrate surface, or may be irradiated by directing an angle of incidence toward a specific angle, but is preferably irradiated perpendicularly to the substrate surface. By this method, the alignment ability of the liquid crystal molecules is imparted to the coating layer.

The substrate temperature at the time of irradiating the ultraviolet light is preferably at room temperature. In some cases, however, the ultraviolet light may be irradiated in a heated state within a temperature range of 100° C. or lower.

Next, the alignment-treated coating layer is heat-treated. Herein, the step of heat-treatment may be carried out at 150 to 250° C. for 1 to 60 minutes, preferably at 180 to 240° C. for 5 to 20 minutes.

The thickness of the final liquid crystal alignment layer formed through the above-described series of steps is preferably 50 to 300 nm.

Furthermore, according to still further embodiment of the present invention, there may be provided a liquid crystal display including the liquid crystal alignment layer of one embodiment.

The liquid crystal display can be prepared according to a conventional method known in the art. In one example thereof, a sealing agent impregnated with a ball spacer is coated in the form of a jar onto the lower plate of the two photoreaction-induced glass substrates having the liquid crystal alignment layer of one embodiment. Subsequently, the alignment layers formed on the upper plate and lower plate are aligned such that they face each other, the upper and lower plates are bonded together using a pressing machine, and then a sealing agent is cured by irradiating UV between the bonded upper and lower plates, thereby preparing an empty cell. Then, a liquid crystal is injected into the empty cell using a liquid crystal injecting device capable of vacuum injection. Thereafter, the sealing agent is coated onto the injection hole of the cell into which the liquid crystal is injected and is cured by UV irradiation, and thereby the liquid crystal cell is completed.

Hereinafter, the action and effects of the present invention will be described in more detail by way of specific Examples. However, these Examples are given for illustrative purposes only, and the scope of the invention is not intended to be limited by these Examples.

EXAMPLES

Synthesis of Acid Chloride

A 500 ml 3-neck round flask was purged with nitrogen gas to remove water and oxygen in the flask, and acid dianhydride and MeOH (10 wt %) were added thereto and heated under reflux for 5 hours at 75° C. After completely dissolving the solid and completing the reaction, the solvent was removed by distillation under reduced pressure to obtain a product. Thereto, ethyl acetate (EA, 0.5 M) was added and stirred. When the solid was dispersed, 3 equivalents of oxalyl chloride was slowly added, and 2 to 3 drops of DMF were added. The reaction mixture was heated to 80° C. and stirred for 6 hours. After completion of the reaction, the solvent was removed by distillation under reduced pressure and washed with hexane 2 to 3 times to remove a trace amount of oxalyl chloride.

Preparation Example 1: Preparation of PMDA-OMe-Cl

PMDA-OMe-Cl (38 g, 86.5%) was obtained using pyromellitic dianhydride (PDMA 30 g, 0.138 mol) through the synthesis method of acid chloride.

Preparation Example 2: Preparation of BPDA-OMe-Cl

BPDA-OMe-Cl (33 g, 82%) was obtained using 3,3',4,4'-biphenyl tetracarboxylic acid dianhydride (BPDA 30 g, 0.102 mol) through the synthesis method of acid chloride.

Example 1

A 500 ml 3-neck round flask was purged with nitrogen gas to remove water and oxygen in the flask, and (E)-4-aminophenyl 3-(4-aminophenyl)acrylate (10.639 g, 0.042 mol) was dissolved in 205.473 g of N-methylpyrrolidone (NMP) and stirred for 1 hour. The temperature of the reactor was maintained at 0 to 10° C. using ice. Then, PMDA-OMe-Cl (15 g, 0.047 mol) obtained in Preparation Example 1, Boc-Phe (NH$_2$)—OH (2.899 g, 0.010 mol), pyridine (8.180 g, 0.103 mol) and 51.368 g of NMP were added dropwise, and the mixture was polymerized for 24 hours to obtain polyamic ester (10 wt %). The obtained polyamic ester was precipitated in a mixture of distilled water and methanol to obtain 25.5 g of solid. The solid was diluted in a solvent of NMP:BE=8:2 and then passed through a 0.1 μm filter to obtain a polyamic ester solution from which impurities were removed.

Example 2

A 500 ml 3-neck round flask was purged with nitrogen gas to remove water and oxygen in the flask, and (E)-4-aminophenyl 3-(4-aminophenyl)acrylate (10.161 g, 0.040 mol) was dissolved in 209.621 g of N-methylpyrrolidone (NMP) and stirred for 1 hour. The temperature of the reactor was maintained at 0 to 10° C. using ice. Then, PMDA-OMe-Cl (15 g, 0.047 mol) obtained in Preparation Example 1, Boc-Phe (NH$_2$)—OH (3.953 g, 0.014 mol), pyridine (8.18 g, 0.103 mol) and 52.405 g of NMP were added dropwise, and the mixture was polymerized for 24 hours to obtain polyamic ester (10 wt %). The obtained polyamic ester was precipitated in a mixture of distilled water and methanol to obtain 26.2 g of solid. The solid was diluted in a solvent of NMP:BE=8:2 and then passed through a 0.1 µm filter to obtain a polyamic ester solution from which impurities were removed.

Example 3

A 500 ml 3-neck round flask was purged with nitrogen gas to remove water and oxygen in the flask, and (E)-4-aminophenyl 3-(4-aminophenyl)acrylate (8.590 g, 0.034 mol) was dissolved in 186.703 g of N-methylpyrrolidone (NMP) and stirred for 1 hour. The temperature of the reactor was maintained at 0 to 10° C. using ice. Then, BPDA-OMe-Cl (15 g, 0.038 mol) obtained in Preparation Example 2, Boc-Phe (NH$_2$)—OH (2.341 g, 0.008 mol), pyridine (6.605 g, 0.084 mol) and 46.676 g of NMP were added dropwise, and the mixture was polymerized for 24 hours to obtain polyamic ester (10 wt %). The obtained polyamic ester was precipitated in a mixture of distilled water and methanol to obtain 25.5 g of solid. The solid was diluted in a solvent of NMP:BE=8:2 and then passed through a 0.1 µm filter to obtain a polyamic ester solution from which impurities were removed.

Example 4

A 500 ml 3-neck round flask was purged with nitrogen gas to remove water and oxygen in the flask, and (E)-4-aminophenyl 3-(4-aminophenyl)acrylate (8.204 g, 0.032 mol) was dissolved in 186.703 g of N-methylpyrrolidone (NMP) and stirred for 1 hour. The temperature of the reactor was maintained at 0 to 10° C. using ice. Then, BPDA-OMe-Cl (15 g, 0.038 mol) obtained in Preparation Example 2, Boc-Phe (NH$_2$)—OH (3.192 g, 0.011 mol), pyridine (6.605 g, 0.084 mol) and 47.513 g of NMP were added dropwise, and the mixture was polymerized for 24 hours to obtain polyamic ester (10 wt %). The obtained polyamic ester was precipitated in a mixture of distilled water and methanol to obtain 25.5 g of solid. The solid was diluted in a solvent of NMP:BE=8:2 and then passed through a 0.1 µm filter to obtain a polyamic ester solution from which impurities were removed.

Comparative Example 1

A 500 ml 3-neck round flask was purged with nitrogen gas to remove water and oxygen in the flask, and (E)-4-aminophenyl 3-(4-aminophenyl)acrylate (12 g, 0.047 mol) was dissolved in 194.196 g of N-methylpyrrolidone (NMP) and stirred for 1 hour. The temperature of the reactor was maintained at 0 to 10° C. using ice. Then, PMDA-OMe-Cl (13.853 g, 0.043 mol) obtained in Preparation Example 1, PA (1.118 g, 0.008 mol), pyridine (7.465 g, 0.094 mol) and 48.549 g of NMP were added dropwise, and the mixture was polymerized for 24 hours to obtain polyamic ester (10 wt %). The obtained polyamic ester was precipitated in a mixture of distilled water and methanol to obtain 24 g of solid. The solid was diluted in NMP:BE=8:2 and then passed through a 0.1 µm filter to obtain a polyamic ester solution from which impurities were removed.

Comparative Example 2

A 500 ml 3-neck round flask was purged with nitrogen gas to remove water and oxygen in the flask, and (E)-4-aminophenyl 3-(4-aminophenyl)acrylate (11 g, 0.043 mol) was dissolved in 199.819 g of N-methylpyrrolidone (NMP) and stirred for 1 hour. The temperature of the reactor was maintained at 0 to 10° C. using ice. Then, BPDA-OMe-Cl (15.727 g, 0.04 mol) obtained in Preparation Example 2, PA (1.025 g, 0.007 mol), pyridine (6.843 g, 0.087 mol) and 49.955 g of NMP were added dropwise, and the mixture was polymerized for 24 hours to obtain polyamic ester (10 wt %). The obtained polyamic ester was precipitated in a mixture of distilled water and methanol to obtain 25 g of solid. The solid was diluted in NMP:BE=8:2 and then passed through a 0.1 µm filter to obtain a polyamic ester solution from which impurities were removed.

Experimental Examples (1) Production of Liquid Crystal Cell

Each of the polymers prepared according to Examples 1 to 4 and Comparative Examples 1 and 2 was diluted to a solid content of 4 to 5% by weight to prepare a photo-aligning agent. A liquid crystal cell was prepared by the following method using the thus-prepared photo-aligning agent.

The identical photo-aligning agent was sufficiently dropped on a substrate (lower plate) having an ITO electrode pattern formed on a glass substrate having a size of 25 mm×27 mm and on a glass substrate (upper plate) having no ITO electrode pattern formed, and then subjected to spin coating at about 1500 to 6000 rpm for 30 seconds or 40 seconds. Under these conditions, a coating layer having a final thickness of 70 to 150 nm was formed on the upper plate and the lower plate.

The upper plate and lower plate coated with the photo-aligning agent were placed on a hot plate at about 70° C. to perform preliminary calcination for 100 seconds. Ultraviolet rays were irradiated with an appropriate exposure amount using an exposure apparatus (UIS-S2021J7-YD01, Ushio LPUV) in which a linear polarizer was adhered to the coating layer formed on the upper plate and the lower plate. Then, the obtained upper and lower plates were heat-treated for 1000 seconds on a hot plate at 230° C.

Thereafter, a sealing agent impregnated with a 3 µm ball spacer was coated onto the lower plate in the form of a jar through EzROBO-3 manufactured by IEI (Iwashita Engineering Inc.). Herein, the sealing agent could be coated to have a thickness of 2 to 5 µm m after sealing. Subsequently, the alignment layers formed on the upper plate and lower plate were aligned such that they face each other, the upper and lower plates were bonded together using a pressing machine (BS-7220), and then the sealing agent was cured by irradiating UV between the bonded upper and lower plates to cure the sealing agent, thereby preparing an empty cell. Then, a liquid crystal was injected into the empty cell using a liquid crystal injecting device capable of vacuum injection. Thereafter, the sealing agent was coated onto the injection hole of the cell into which the liquid crystal was injected and was cured by UV irradiation, thereby preparing the liquid crystal cell.

(2) Evaluation of Liquid Crystal Alignment Property

In the case of preparing liquid crystal cells by coating the photo-alignment layer irradiated with an appropriate exposure amount (0.5 to 3 J), it was indicated by "○" when an initial alignment is formed through the interaction between the liquid crystal and the alignment layer, and it was indicated by "X" when a severe flow mark occurs.

(3) Evaluation of Imidization Rate

The IR spectrum of the coating layer obtained by preliminary calcination on a hot plate at 70° C. for 100 seconds and the IR spectrum of the coating layer obtained by calcination (curing) on a hot place at 230° C. for 1000 seconds after coating of the photo-aligning agent during the preparation process of the liquid crystal cell were obtained. Then, the area (S) of the N—H peak appearing at 1540 cm-1 in the IR spectra above was compared, and the rate of reduction after calcination at 230° C. was defined as the imidization rate. The rate was calculated and shown in Table 1

TABLE 1

| | Appropriate exposure amount | Liquid crystal aligning property | Imidization rate |
| --- | --- | --- | --- |
| Example 1 | 0.75 to 1 J | ○ | 62 |
| Example 2 | | ○ | 78 |
| Example 3 | | ○ | 60 |
| Example 4 | | ○ | 81 |
| Comparative Example 1 | 1 to 3 J | ○ | 53 |
| Comparative Example 2 | | ○ | 50 |

Referring to Table 1 above, it can be confirmed that the liquid crystal aligning agent of Examples includes the polyamic ester having a specific terminal group and thus exhibit a very high imidization rate, as compared to the Comparative Examples including the polyamic ester which does not include the terminal group.

What is claimed is:

1. A liquid crystal aligning agent comprising: at least one selected group the group consisting of a polyimide precursor including a repeating unit represented by Chemical Formula 1 below and a terminal group represented by Chemical Formula 2 below; and a polyimide including a repeating unit represented by Chemical Formula 3 below and a terminal group represented by Chemical Formula 2 below:

[Chemical Formula 1]

[Chemical Formula 2]

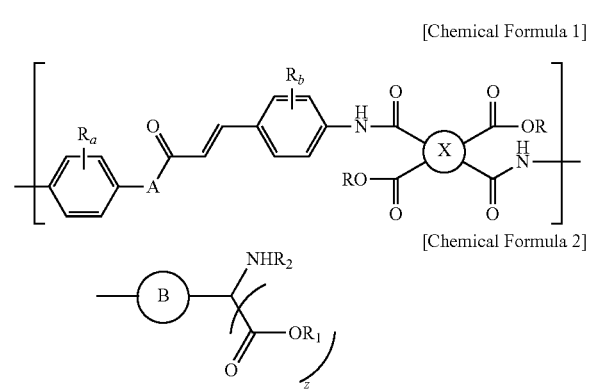

[Chemical Formula 3]

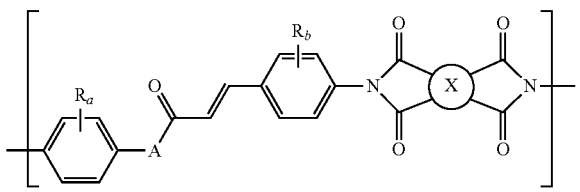

in Chemical Formulae 1 to 3,
X is each independently a tetravalent organic group,
R is each independently hydrogen or a $C_{1-10}$ alkyl group,
$R_a$ and $R_b$ are each independently hydrogen or a $C_{1-10}$ alkyl group,
$R_1$ is hydrogen or a $C_{1-10}$ alkyl group,
$R_2$ is a tert-butoxycarbonyl group or a 9-fluorenyl-methoxycarbonyl group,
A is —O—, —S—, —NH— or a $C_{1-10}$ alkylene group,
B is at least one bivalent functional group selected from the group consisting of a $C_{1-10}$ alkylene group, a $C_{6-20}$ arylene group, a $C_{7-20}$ arylalkylene group,

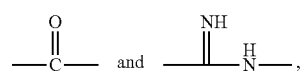

and
Z is 0 or 1.

2. The liquid crystal aligning agent of claim 1, wherein X is each independently at least one functional group selected from the group consisting of Chemical Formulae 4 to 7 below:

[Chemical Formula 4]

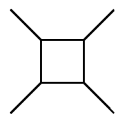

[Chemical Formula 5]

[Chemical Formula 6]

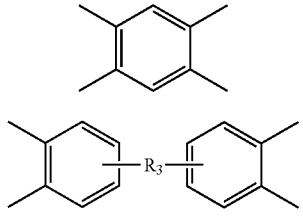

[Chemical Formula 7]

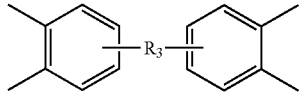

in Chemical Formulae 6 and 7,
$R_3$ to $R_6$ are each independently at least one bivalent functional group selected from the group consisting of a direct bond, —O—, —S—, —C(O)—, —S(O)—, —C(O)O—, —O(C)O—, $C_{1-10}$ alkylene and —C(R')(R")—, wherein the R' and R" are each independently a $C_{1-10}$ alkyl group substituted or unsubstituted with hydrogen or halogen.

3. The liquid crystal aligning agent of claim 1, wherein the polyimide precursor has a weight average molecular weight of 5,000 to 100.000 g/mol.

4. The liquid crystal aligning agent of claim 1, wherein the polyimide has a weight average molecular weight of 5,000 to 100.000 g/mol.

5. The liquid crystal aligning agent of claim 1, in a state of being dissolved in an organic solvent.

6. The liquid crystal aligning agent of claim 5, wherein the organic solvent is selected from cyclopentanone, cyclohexanone, N-methylpyrrolidone, DMF (dimethylformamide), acetamide, γ-butyrolactone, 2-butoxyethanol and a mixture thereof.

7. The liquid crystal aligning agent of claim 5, wherein the solid concentration of the polyimide precursor and polyimide is 0.5 to 30% by weight.

8. A liquid crystal alignment layer comprising the liquid crystal aligning agent of claim 1.

9. The liquid crystal alignment layer of claim 8, wherein the thickness thereof is 50 to 300 nm.

10. A method for preparing a liquid crystal alignment layer comprising:
   coating the liquid crystal aligning agent of claim 1 onto a substrate to form a coating layer;
   drying the coating layer;
   irradiating the surface of the dried coating layer with polarized ultraviolet light to perform alignment treatment; and
   heat-treating the alignment-treated coating layer.

11. The method for preparing a liquid crystal alignment layer of claim 10, wherein the drying step is carried out at 50 to 150° C. for 10 to 300 seconds.

* * * * *